United States Patent
Sasanka et al.

(10) Patent No.: US 9,170,789 B2
(45) Date of Patent: Oct. 27, 2015

(54) ANALYZING POTENTIAL BENEFITS OF VECTORIZATION

(71) Applicant: INTEL CORPORATION, Santa Clara, CA (US)

(72) Inventors: Ruchira Sasanka, Hillsboro, OR (US); Jeffrey J. Cook, Portland, OR (US); Abhinav Das, San Jose, CA (US); Jayaram Bobba, Portland, OR (US); Michael R. Greenfield, Gig Harbor, WA (US); Suresh Srinivas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 67 days.

(21) Appl. No.: 13/997,140

(22) PCT Filed: Mar. 5, 2013

(86) PCT No.: PCT/US2013/029165
§ 371 (c)(1),
(2) Date: Jun. 21, 2013

(87) PCT Pub. No.: WO2014/137327
PCT Pub. Date: Sep. 12, 2014

(65) Prior Publication Data
US 2014/0258677 A1   Sep. 11, 2014

(51) Int. Cl.
*G06F 9/44* (2006.01)
*G06F 9/45* (2006.01)

(52) U.S. Cl.
CPC ........................ *G06F 8/41* (2013.01)

(58) Field of Classification Search
None
See application file for complete search history.

(56) References Cited

U.S. PATENT DOCUMENTS

| | | | | |
|---|---|---|---|---|
| 5,825,677 | A | * | 10/1998 | Agarwal et al. ............... 708/520 |
| 8,505,002 | B2 | * | 8/2013 | Yehia et al. .................. 717/149 |
| 2004/0003381 | A1 | * | 1/2004 | Suzuki et al. ................ 717/150 |
| 2005/0289529 | A1 | * | 12/2005 | Almog et al. ................ 717/158 |
| 2006/0195828 | A1 | * | 8/2006 | Nishi et al. .................. 717/140 |
| 2008/0229298 | A1 | * | 9/2008 | O'Brien et al. .............. 717/160 |
| 2008/0250399 | A1 | * | 10/2008 | Huang et al. ................ 717/151 |

(Continued)

FOREIGN PATENT DOCUMENTS

WO  WO2010077953  A2  7/2010
WO  WO2011087590  A2  7/2011

OTHER PUBLICATIONS

"Optimizing Dynamic Binary Translation for SIMD Instructions", Zhang et al., Proceedings of the International Symposium on Code Generation and Optimization (CGO'06), 2006 IEEE.*

(Continued)

*Primary Examiner* — Don Wong
*Assistant Examiner* — Daxin Wu
(74) *Attorney, Agent, or Firm* — Schwabe, Williamson & Wyatt, P.C.

(57) ABSTRACT

Embodiments of computer-implemented methods, systems, computing devices, and computer-readable media (transitory and non-transitory) are described herein for analyzing execution of a plurality of executable instructions and, based on the analysis, providing an indication of a benefit to be obtained by vectorization of at least a subset of the plurality of executable instructions. In various embodiments, the analysis may include identification of the subset of the plurality of executable instructions suitable for conversion to one or more single-instruction multiple-data ("SIMD") instructions.

17 Claims, 8 Drawing Sheets

(56) References Cited

U.S. PATENT DOCUMENTS

| | | |
|---|---|---|
| 2010/0095285 A1* | 4/2010 | Gschwind ..................... 717/154 |
| 2010/0241824 A1 | 9/2010 | Carlson et al. |
| 2010/0293534 A1* | 11/2010 | Andrade et al. ............. 717/146 |
| 2012/0254845 A1* | 10/2012 | Yi et al. ........................ 717/144 |
| 2013/0036293 A1* | 2/2013 | Gonion ............................. 712/7 |
| 2014/0188961 A1* | 7/2014 | Plotnikov et al. ............. 708/201 |
| 2014/0189321 A1* | 7/2014 | Uliel et al. .................... 712/222 |

OTHER PUBLICATIONS

International Search Report and Written Opinion mailed Sep. 6, 2013 for International Application No. PCT/US2013/029165, 10 pags.

* cited by examiner

VECTOR REPORT FOR LOOP IP 0x40f6e8

Program Impact (Coverage) of Loop [?]

| | | |
|---|---|---|
| Percent of Instr. in loop (wrt process) | 3.1% | ***.. (3.1) |

Vectorizability of Loop [?]

| | | |
|---|---|---|
| Percent of Independent Instr. (wrt loop) | 100% | ****** (5.0) |
| Percent of Vectorizable (as Packed) Instr. (wrt loop) | 100% | ****** (5.0) |
| Average Trip Count * Operand Size (B) | 185.6 | ****** (5.0) |
| No. of Basic Blocks in Loop | 1.0 | ****** (5.0) |
| No. of two-edge Basic Blocks Seen in Loop | 0.0 | ****** (5.0) |
| Current Data Operand Size (B) | 8.0 | ****** (5.0) |
| Overall Star Rating (Vectorizability) | 5.0 | ****** (5.0) |

Gain Estimates (ignoring coding complexity) [?]

| | |
|---|---|
| Potential 512b Gain (Instr. Ratio, wrt Process) | 1.03X |
| Potential 512b Gain (Instr. Ratio, wrt Loop) | 7.73X |

Legend
Assembly Code for Loop
Control Flow Grap for Hot Region
Debug File for Hot Region
Source File: tml.f, line 799-799

ANALYZING POTENTIAL BENEFITS OF VECTORIZATION

CROSS REFERENCE TO RELATED APPLICATIONS

The present application is a national phase entry under 35 U.S.C. §371 of International Application No. PCT/US2013/029165, filed Mar. 5, 2013, entitled "ANALYZING POTENTIAL BENEFITS OF VECTORIZATION", which designated, among the various States, the United States of America. The Specification of the PCT/US2013/029165 Application is hereby incorporated by reference.

FIELD

Embodiments of the present invention relate generally to the technical field of data processing, and more particularly, to analyzing potential benefits of vectorizing executable instructions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Support for vectorized instructions, such as single instruction, multiple data ("SIMD") instructions, is expanding in computing architectures. However, the percentage of computer code that is vectorized (e.g., converted to SIMD) to take advantage of this expansion remains low. While tools exist to analyze source code for vectorization opportunities, source code may not always be available, and in some instances only non-human-readable, readily-executable instructions such as binary instructions (e.g., machine code) and/or bytecode are available.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Techniques are described herein for vectorization benefit analysis. As used herein, "vectorization benefit analysis" may refer to analyzing execution of a plurality of executable instructions for vectorization opportunities and/or providing an indication of potential benefits of vectorization. As used herein, a "plurality of executable instructions" may refer generally to a computer program that is readily-executable (e.g., full compilation is not required). A readily-executable plurality of executable instructions may include non-human-readable instructions, such as binary instructions (e.g., machine code), bytecodes (e.g., executable by a software interpreter), and so forth. Human-readable source code (e.g., written in C, C++, etc.), in contrast, would not be considered "readily executable" because it is not executable without at least some compilation. Another example of a readily-executable plurality of executable instructions may additionally or alternatively include a computer program trace, such as a dynamic trace of a prior execution of instructions (e.g., generated from monitoring an actual execution of the instructions or from a recorded trace in any form). In various embodiments, the indication of potential benefits of vectorization may be provided for reporting to a user and/or as input to another system or process.

Figure 1:
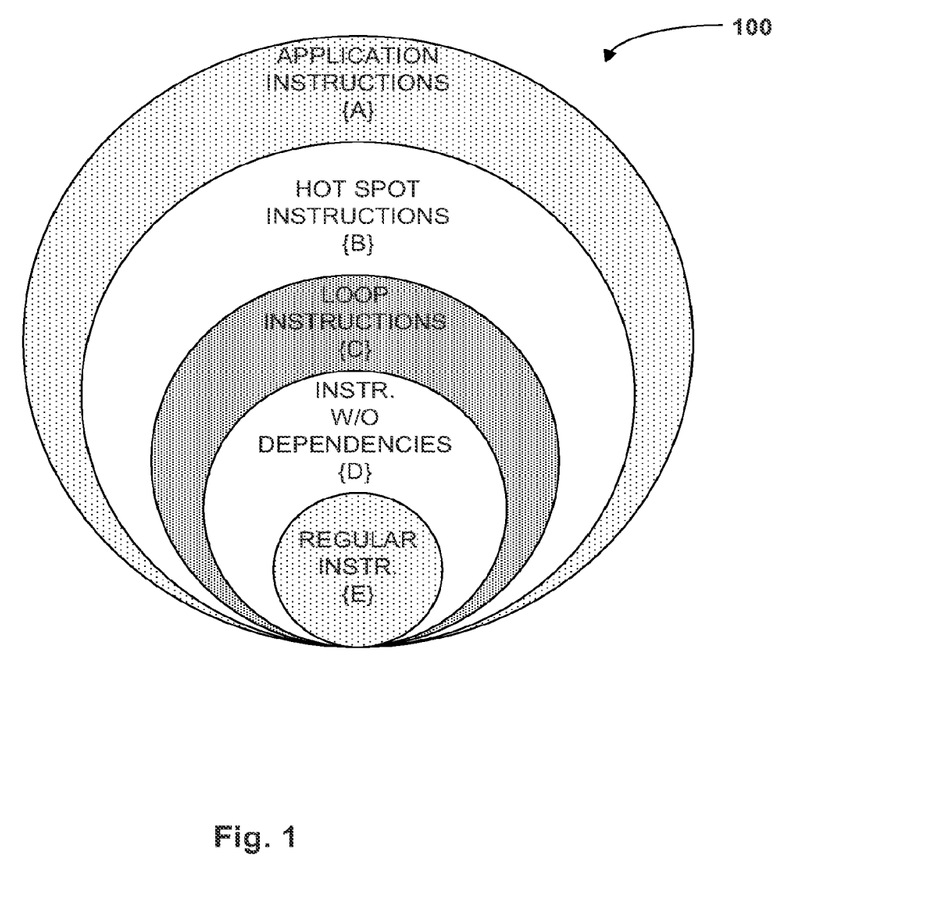
FIG. 1 schematically illustrates example groups of executable instructions that may be identified during vectorization benefit analysis, in accordance with various embodiments.

FIG. 1 depicts a Venn diagram 100 showing various sets and subsets of executable instructions that may be identified and/or detected at various stages of vectorization benefit analysis, in accordance with various embodiments. A first set of executable instructions, designated {A}, may include all executable instructions in a computer program or trace being analyzed, and may serve as a starting point of vectorization benefit analysis. Sets {B}-{E} represent subsets of {A} and/or of each other. As will be described in more detail below, {B} may include executable instructions located in relatively execution-intensive spots (e.g., frequently-executed loops) of {A}. {C} may include executable instructions located in one or more loops, such as executable instructions in {B} that are contained in loops. {D} may include executable instructions without vector dependencies, such as executable instructions in {C} without inter-iteration dependencies. {E} may include executable instructions that are suitable for vectorization (e.g., conversion to single instruction multiple data, or "SIMD," instructions) as packed. These may include executable instructions with regular operand memory access patterns, such as instructions with register operands or instructions accessing memory at constant or predictable intervals.

In various embodiments, vectorization benefit analysis may include identification of a subset of the plurality of executable instructions suitable for vectorization. In various embodiments, a group of executable instructions, e.g., forming a basic block, may be suitable for vectorization if the instructions are convertible to one or more SIMD instructions. Various Instruction Set Architectures ("ISA") may include vector/SIMD instructions, including but not limited to the Advanced Vector Extensions ("AVX"), AVX2, and the Streaming SIMD Extensions ("SSE"), all by the Intel® Corporation of Santa Clara, Calif.

Figure 2:
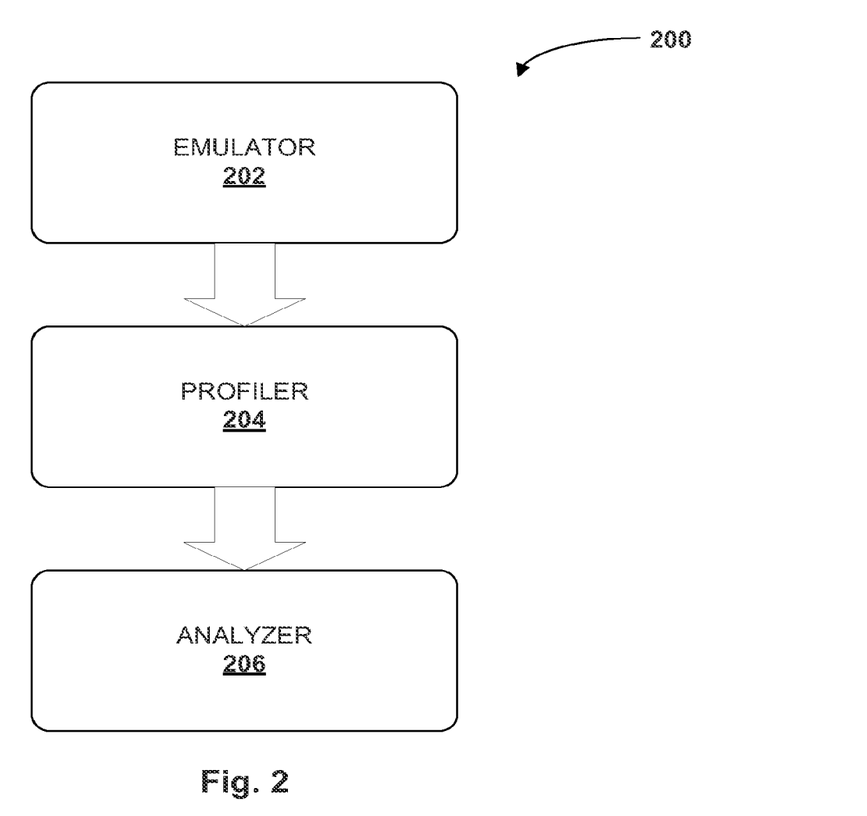
FIG. 2 schematically illustrates an example system for analyzing execution of executable instructions for vectorization opportunities, in accordance with various embodiments.

Referring to FIG. 2, in various embodiments, a system 200 for vectorization benefit analysis may include an emulator 202 configured to emulate execution of a plurality of executable instructions. Emulator 202 may include any combination of hardware and software. A variety of existing tools may be used as emulator 202. For example, in some embodiments, one or more of Pin—a dynamic binary instrumentation tool, and Software Development Emulator ("SDE"), both by Intel®, may be used as emulator 202. In some embodiments, a tool for analyzing instruction traces, such as Funcsim, may be used as emulator 202. These examples are not meant to be limiting, and other tools may be used as emulator 202.

In various embodiments, a profiler 204 may be configured to monitor execution of executable instructions in {A}, and to employ various binary translation and/or compiler techniques to detect one or more execution-intensive spots, also referred to as "hot spots" or "hot zones." Hot spots may be identified in various ways. In some embodiments, hot spots may include sequences and/or groups of executable instructions that are executed more than a threshold percentage of a total operating time and/or operating cycles of a computer program. For example, if execution of a set of executable instructions constitutes more than 40% of total cycles of a computer program or instruction trace, then that set of instructions may be characterized as a hot spot. Given the higher rate of execution, the potential benefits of vectorizing hot spot executable instructions may be greater than, for instance, the potential benefits of vectorizing less-often-executed executable instructions. In FIG. 1, a subset of executable instructions within {A}, designated {B}, are identified as being within hot zone(s).

In various embodiments, profiler 204 may be configured to generate other information about execution of executable instructions. For example, in various embodiments, profiler 204 may be configured to generate a dynamic branch direction profile, a dynamic memory (e.g., load/store address) profile, instruction bytes (e.g., decoded using X86 Encoder Decoder, or "XED"), and so forth. In various embodiments, a dynamic branch direction profile may include data about which branches are followed during execution of {A} and/or {B}. In various embodiments, the dynamic load/store address profile may include data about addresses of memory locations accessed during execution of {A} and/or {B}. In various embodiments, instruction bytes may include data about which operations (e.g., opcodes such as add, branch, subtract, etc.) were performed during execution of {A} and/or {B}.

In various embodiments, system 200 may include an analyzer 206 configured to analyze the information generated by profiler 204. In various embodiments, analyzer 206 may be configured determine a benefit that may be obtained by vectorizing at least some executable instructions of a plurality of executable instructions. As part of this analysis, in various embodiments, analyzer 206 may be configured to identify one or more of the groups designated {C}-{E} in FIG. 1.

For example, in various embodiments, analyzer 206 may be configured to detect executable instructions in one or more loops, designated {C} in FIG. 1. To detect loops, in various embodiments, analyzer 206 may employ techniques such as building a control flow graph and then performing back-edge detection on the graph.

Figure 3:
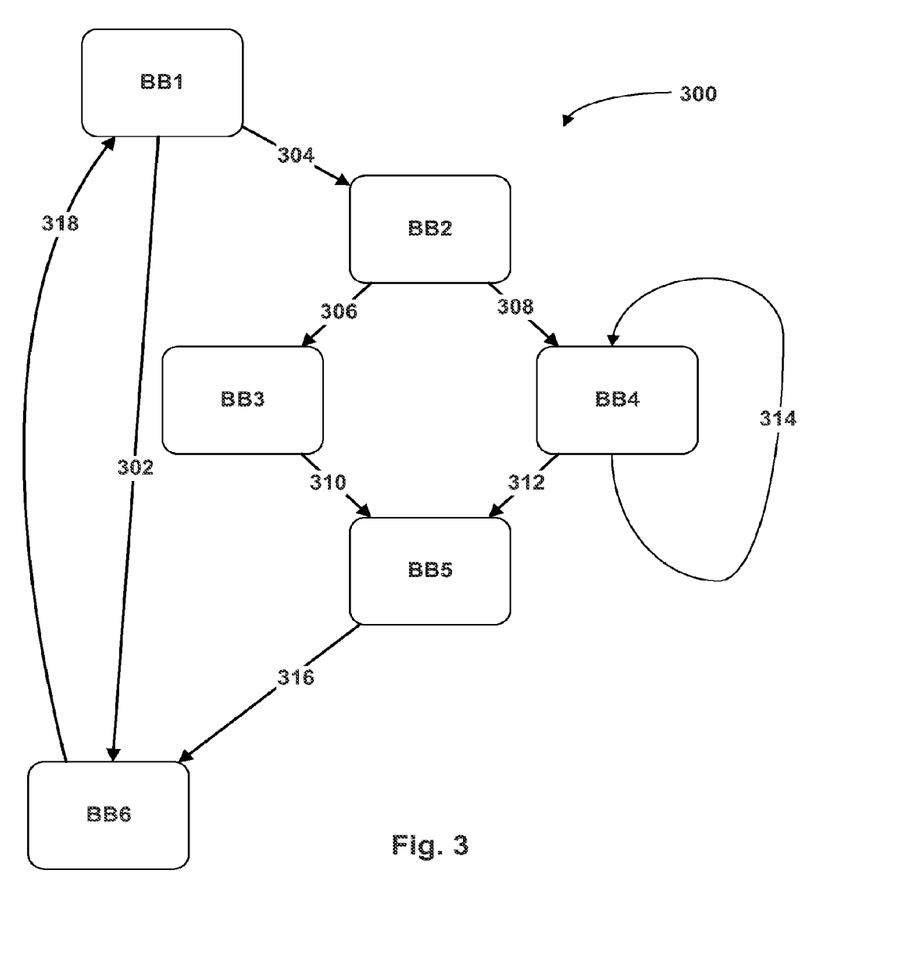
FIG. 3 schematically depicts an example control flow graph that may be generated and used for vectorization benefit analysis, in accordance with various embodiments.

An example control flow graph 300 is shown in FIG. 3. In this example, control may start at a first basic block of instructions denoted "BB1." Control may then flow down either path 302 to a basic block of instructions denoted "BB6" or down path 304 to another basic block of instructions denoted "BB2." Control may flow from BB2 down path 306 to a basic block of instructions denoted "BB3" or down path 308 to another basic block of instructions denoted "BB4." At BB3, control may flow down path 310 to a basic block of instructions denoted "BB5." At BB4, however, control may flow either down path 312 to BB5, or may loop back to BB4 over path 314. Thus, path 314 constitutes a loop. Control may remain at BB4 until a condition is met that causes control to exit the loop defined by path 314. At BB5, control may flow to BB6 over path 316. At BB6, control may flow back to BB over path 318. Thus, the various paths that may be taken from BB1 to BB6 and back again may constitute another loop. Additionally, the loop defined by path 314 may be a nested loop within the "larger" loop between BB1 and BB6. In various embodiments, executable instructions within loops such as these may form {C}.

Referring back to FIGS. 1 and 2, in various embodiments, analyzer 206 may be configured to detect a subset of executable instructions, e.g., from within {C}, that are without vector or inter-loop-iteration dependencies. Such a subset of instructions is identified as {D} in FIG. 1. To detect {D}, in various embodiments, analyzer 206 may perform dependence analysis, e.g., to identify execution-order constraints (e.g., inter-loop-iteration dependencies) between instructions, to determine whether it is safe to reorder executable instructions. In various embodiments, analyzer 206 may perform static dependency analysis on registers to identify data dependencies. In various embodiments, analyzer 206 may perform re-convergent analysis to discover where two edges of a branch converge, e.g., to identify control dependencies. For instance, in FIG. 3, the branch at the end of BB2 converges at BB5 making all instructions in BB3 and BB4 dependent on the branch at the end of BB2.

Figure 4:
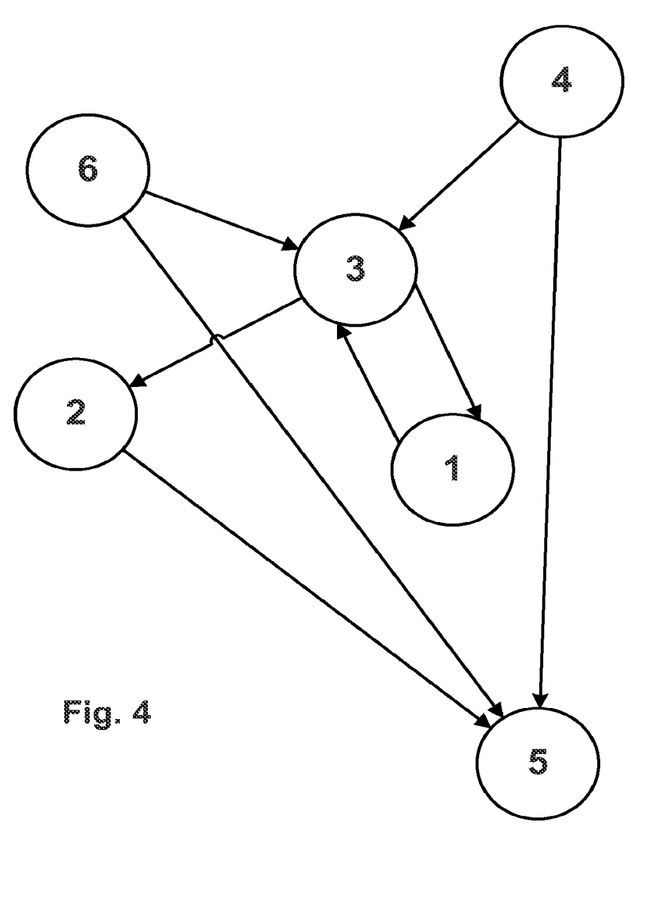
FIG. 4 schematically depicts a dependency chain that may be generated and used for vectorization benefit analysis, in accordance with various embodiments.

As part of dependence analysis, in various embodiments, analyzer 206 may be configured to generate one or more dependence chains. A dependence chain C for instruction I lists all the instructions on which I is directly/indirectly dependent (e.g., direct/indirect producers of a value consumed by I). If C contains I itself (e.g., I is directly/indirectly dependent on itself), instruction I may have an inter-iteration dependence that prevents vectorization, and thus may not be assigned to {D}. On the other hand, if I is not directly/indirectly dependent on itself, I may be assigned to {D}. An example dependence chain is depicted in FIG. 4. Instructions 1 and 3 in FIG. 4 may be potentially dependent on themselves, and so may not be vectorizable.

In various embodiments, analyzer 206 may be configured to detect, e.g., from the set of executable instructions that are without vector dependencies, {D} in FIG. 1, one or more executable instructions suitable for conversion to one or more SIMD instructions. These instructions are designated as {E} in FIG. 1. To identify {E}, in some embodiments, analyzer 206 may identify instructions that cause accesses of memory at addresses of regular intervals. For example, an instruction that accesses memory at a contiguous sequence of memory locations, or at least at a discernable pattern of memory locations (e.g., every other, every third, etc.), may be considered to access memory at "regular" intervals, and may be described as having a constant "stride." In various embodiments, the basic blocks of executable instructions in {E} may be considered vectorizable (e.g., convertible to SIMD). Potential gains to be obtained from that vectorization may be determined and provided, e.g., by analyzer 206, as a report to a user, or as input to an automated system for optimizing executable instructions.

Figure 5:
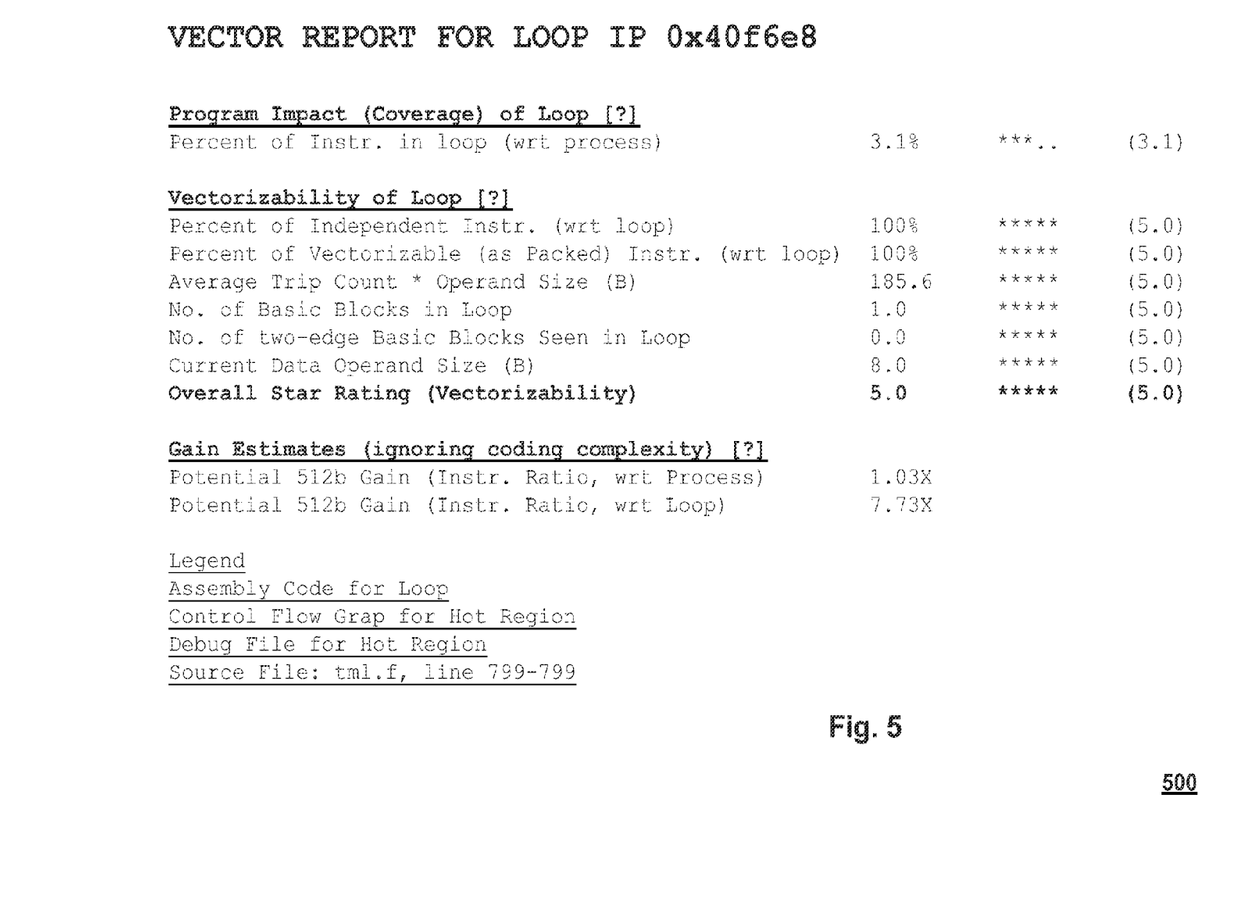
FIG. 5 schematically depicts an example report that may be generated to provide results of vectorization benefit analysis, in accordance with various embodiments.

FIG. 5 depicts an example report 500 that may be generated, e.g., by analyzer 206, to provide results of vectorization benefit analysis, in accordance with various embodiments. The information and benefits presented in report 500 are not meant to be limiting, and other information and statistics may be presented in reports depending on preferences of the entity performing the vectorization benefit analysis. In various embodiments, report 500 may take the form of a HyperText Markup Language ("HTML") document with hyperlinks and other components commonly found on webpages. Report 500 may additionally or alternatively take other forms, such as via a graphical user interface ("GUI") of a vectorization benefit analysis computer program.

In various embodiments, report 500 may include various quantities computed during vectorization benefit analysis. For example, report 500 may include a percentage of executable instructions contained in a loop, or {C}, as compared to all instructions in a process, or {A}. Thus, in this example, the executable instructions in {C} may form 3.1% of all executable instructions in {A}. In various embodiments, report 500 may additionally or alternatively include a percentage of executable instructions without vector dependencies, or {D} (referred to in FIG. 5 as "Independent Instr."), as compared to {C}, which is 100% in this example. In various embodiments, report 500 may additionally or alternatively include percentage of vectorizable instructions, or {E} (referred to in FIG. 5 as "Vectorizable (as Packed)"), as compared to {C}, which is 100% in this example.

In various embodiments, report 500 may include an average trip count multiplied by a data operand size. In various embodiments, "average trip count" may refer to the average iterations of executable instructions in {C} (e.g., the average number of times executable instructions in the loop are executed). In the example of FIG. 5, the data operand size, which may be the width of data on which the original instruction may act, is 8.0 Bytes, which when multiplied by the average trip count yields 185.6. In various embodiments, report 500 may include a number of basic blocks and two-edge basic blocks in {C}, which in this example are 1.0 and 0, respectively, to capture the amount of control-complexity inside the loop.

In various embodiments, a ranking system may be employed to provide a quick and simple indication to users of how much the various aforementioned quantities affect the potential benefits of vectorization. For example, in report 500, a series of stars "*" is depicted to the right of the various percentages and quantities. These stars may provide a rough indication of how each of those quantities is affecting the impact of vectorization.

As noted above, instructions in {C} form 3.1% of the entire computer program {A}, which may equate to three of five stars. In various embodiments, if instructions in {C} formed a higher percentage of the entire program {A}, e.g., 50%, then four or five stars might be given. If instructions in {C} formed a lower percentage of {A}, e.g., 1%, then one or zero stars may be given. In various embodiments, the number of stars given for a particular quantity may be based on various thresholds of impact associated with that quantity. Such thresholds may be determined and/or configured by a user, e.g., based on empirical data and/or user preferences.

In various embodiments, information about benefits that may be obtained by vectorization may be reported in report 500. For example, in some embodiments, report 500 may include a reduction of a count of the plurality of executable instructions of the entire program, or {A}, that may be achieved by vectorization. In FIG. 5, for instance, it is reported that vectorization would yield a gain of 1.03× with regard to the entire program {A}. As another example, in some embodiments, report 500 may include a reduction of a count of executable instructions with respect to executable instructions the loop {C}, which here is 7.73×.

In various embodiments, other information may be included in report 500. For example, "loop unrolling" is an optimization process, performed during compilation, in which executable instructions in a loop are replicated a number of times referred to as the "loop unrolling factor." In some embodiments, analyzer 206 may be configured to determine a loop unrolling factor, e.g., for provision in report 500.

Additionally or alternatively, report 500 may include user-operable elements such as links to various types of information. For instance, in FIG. 5, report 500 includes links to assembly code of the loop {C}, a control flow graph generated for this particular program (e.g., 300 in FIG. 3), a debugging file for a hot region of {B}, and a source file.

In various embodiments, analyzer 206 may determine the potential gains from vectorization using an algorithm such as one below.

Potential Gain = Total_Insts / (Estimated_Vector_Insts + Non_Vectorizable_Insts)
where,
    Total_Insts = {A}
    Non_Vectorizable_inst = {A} − {E} // e.g., total non vectorizable insts
    Estimated_Vector_Insts = {E} / Iteration_Reduction_Ratio
    where,
        Iteration_Reduction_Ratio = Avg_Trip_Count / Vectorized_Trip_Count where,
  Avg_Trip_Count = Average trip count of the loop
  Vectorized_Trip_Count = ceil(Avg_Trip_Count *
                          Vector_Element_Size / SIMD_Width)
  where,
    SIMD_Width = SIMD register width in bytes
    Vector_Element_Size = Size of a data operand in executable
      instructions of {E}

In this example, "Potential Gain" may be a positive number that provides an indication of a gain (e.g., as a percentage) that may be obtained by vectorization. "Total_Insts" may be a positive number that refers to a total number of executable instructions in {A}. "Estimated_Vector_Insts" may be a positive number that refers to an estimated number of executable instructions identified as suitable for conversion to SIMD instructions (e.g., {E}), divided by a so-called "Iteration_Reduction_Ratio." "Non_Vectorizable_Insts" may be a positive number that refers to a difference between the total number of executable instructions in {A} and a number of the executable instructions in {A} that are not vectorizable (e.g., {A}-{E}). "Iteration_Reduction_Ratio" may be a positive number that refers to a so-called "Avg_Trip_Count" divided by a so-called "Vectorized_Trip_Count." "Avg_Trip_Count" may be a positive number that refers to an average number of loop iterations of a loop under examination. "Vectorized_Trip_Count" may be a positive number that refers to an upward-rounded product of "Avg_Trip_Count" and a so-called "Vector_Element_Size," divided by a so-called "SIMD_Width." "Vector_Element_Size" may be a positive number that refers to a size of a data operand operated on by an instruction. "SIMD_Width" may be a positive number that refers to a width of a SIMD register, e.g., in Bytes.

Figure 6:
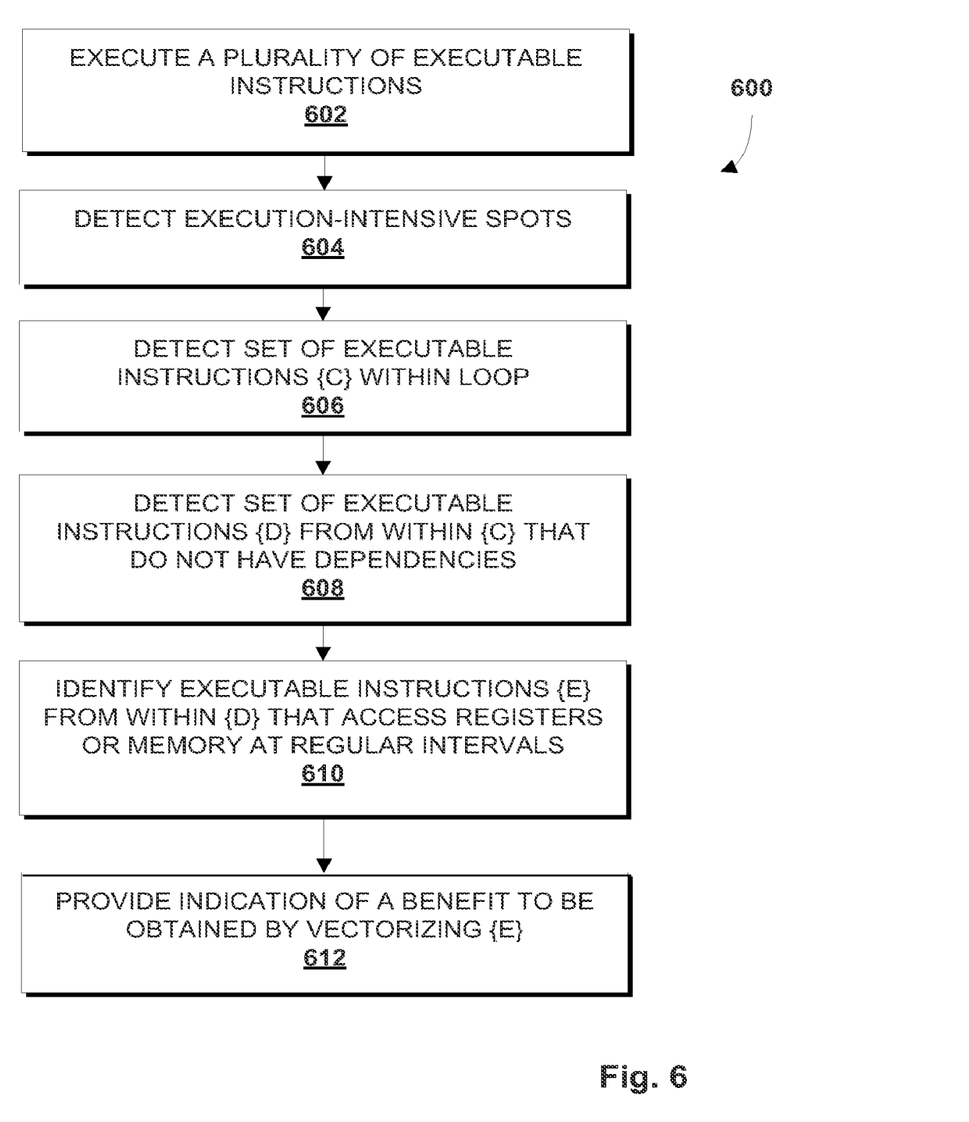
FIG. 6 schematically depicts an example method that may be implemented to perform vectorization benefit analysis, in accordance with various embodiments.

FIG. 6 depicts an example method 600, various aspects of which may be implemented by one or more of emulator 202, profiler 204 and/or analyzer 206 to perform vectorization benefit analysis. These techniques may be used on integer or floating point ("FP") code, and may be used on both scalar code and already-partially vectorized code (e.g., SSE to AVX). At block 602, a plurality of executable instructions {A}, such as a computer program or instruction trace, may be executed, e.g., by emulator 202. At block 604, execution-intensive spots, or "hot spots" {B}, of the plurality of executable instructions may be detected, e.g., by profiler 204.

At block 606, set of executable instructions comprising a loop, e.g., {C}, may be detected from within the plurality of executable instructions {A}, e.g., by analyzer 206. At block 608, a set of executable instructions, e.g., {D}, may be detected, e.g., by analyzer 206 from within {C}, that do not have dependencies, which may prevent vectorization. At block 610, one or more executable instructions, e.g., {E}, may be detected, e.g., by analyzer 206 from within {D}, that access registers or memory at regular intervals. At block 612, an indication of a benefit to be obtained by vectorizing instructions in {E} may be provided, e.g., by analyzer 206. In some embodiments, those benefits may be provided in a report, such as report 500 of FIG. 5. In some embodiments, those benefits may be provided as input to another computer program, e.g., to allow the other computer program to selectively perform vectorization of one or more executable instructions in the plurality of executable instructions {A}.

Figure 7:
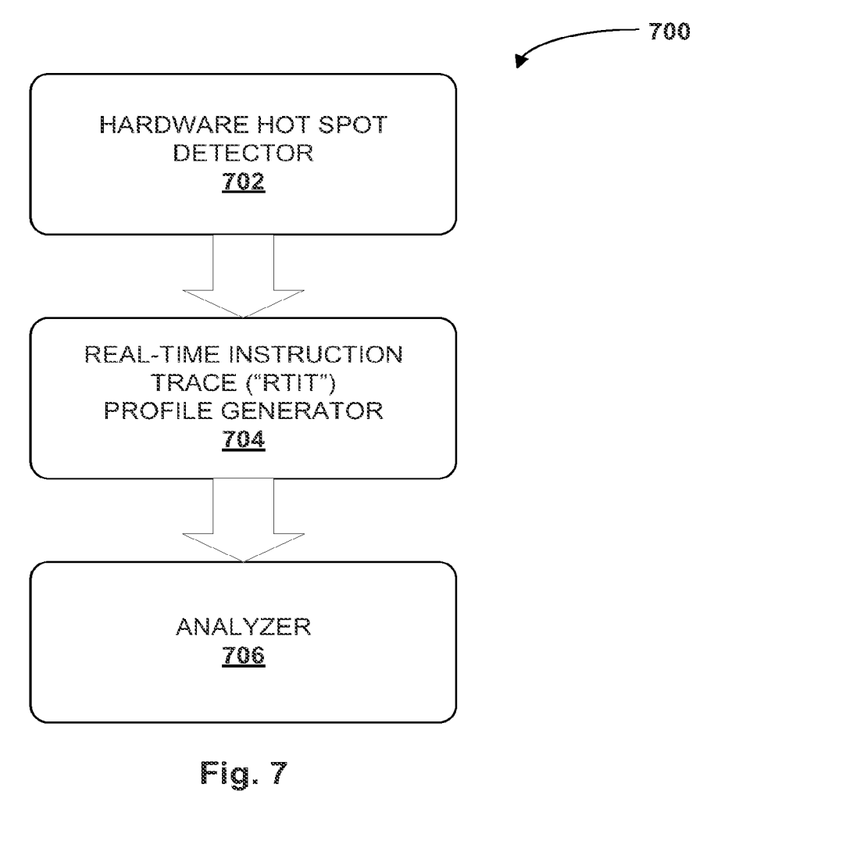
FIG. 7 schematically illustrates another example system for vectorization benefit analysis, in accordance with various embodiments.

FIG. 7 depicts an alternative hardware/software co-designed system 700, similar to system 100 of FIG. 2, which may be used to perform real-time vectorization benefit analysis, in accordance with various embodiments. A hardware-based hot spot detector 702 may be configured to detect hotspots within a current-executing plurality of executable instructions, particularly an RTIT. Based on those detected hotspots, a trace profiler 704, which in some cases may also be hardware-based, may provide various profiles similar to those described above with respect to profiler 204 of FIG. 2. An analyzer 706 may be configured to perform various analysis operations similar to those described herein with respect to analyzer 206 of FIG. 2.

Figure 8:
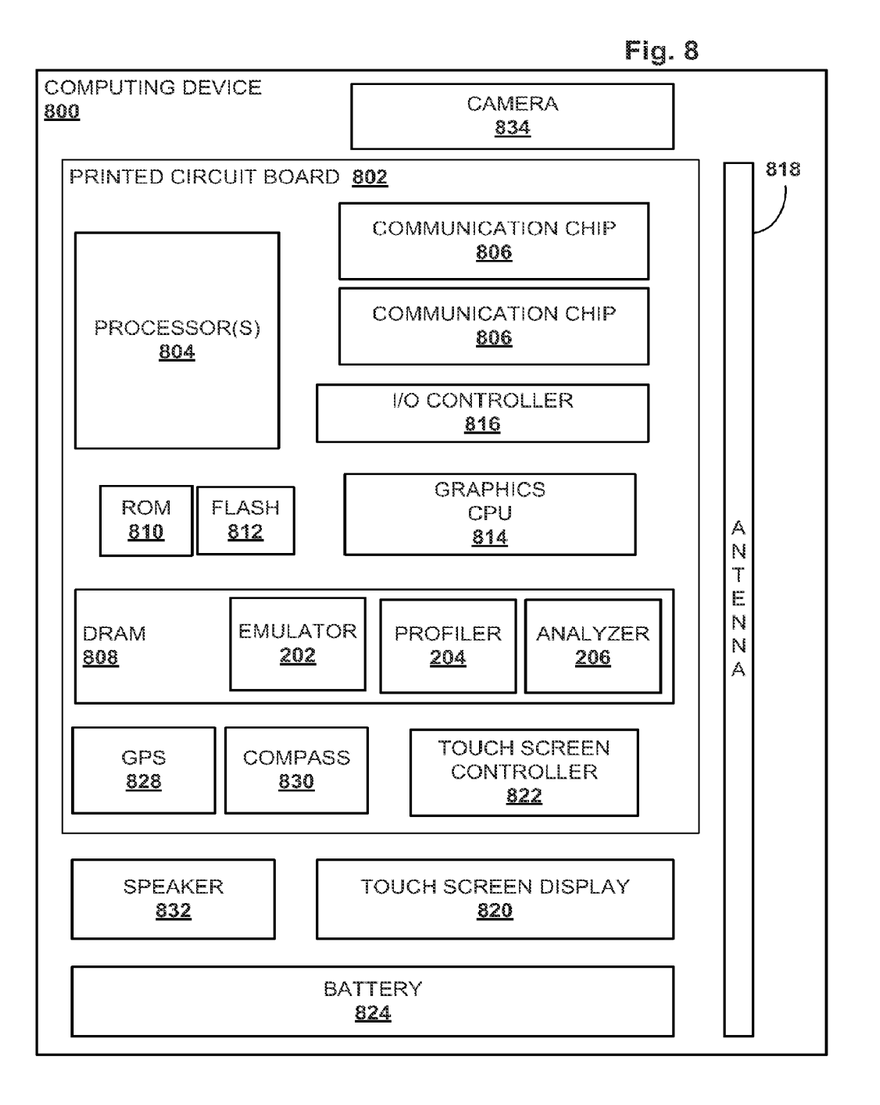
FIG. 8 schematically depicts an example computing device on which disclosed methods and computer-readable media may be implemented, in accordance with various embodiments.

FIG. 8 illustrates an example computing device 800, in accordance with various embodiments. Computing device 800 may include a number of components, one or more processor(s) 804 and at least one communication chip 806. In various embodiments, the processor 804 may be a processor core. In various embodiments, the at least one communication chip 806 may also be physically and electrically coupled to the processor 804. In further implementations, the communication chip 806 may be part of the processor 804. In various embodiments, computing device 800 may include printed circuit board ("PCB") 802. For these embodiments, processor 804 and communication chip 806 may be disposed thereon. In alternate embodiments, the various components may be coupled without the employment of PCB 802.

Depending on its applications, computing device 800 may include other components that may or may not be physically and electrically coupled to the PCB 802. These other components include, but are not limited to, volatile memory (e.g., dynamic random access memory 808, also referred to as "DRAM"), non-volatile memory (e.g., read only memory 810, also referred to as "ROM"), flash memory 812, a graphics processor 814, an input/output controller 816, a digital signal processor (not shown), a crypto processor (not shown), one or more antenna 818, a display (not shown), a touch screen display 820, a touch screen controller 822, a battery 824, an audio codec (not shown), a video codec (not shown), a global positioning system ("GPS") device 828, a compass 830, an accelerometer (not shown), a gyroscope (not shown), a speaker 832, a camera 834, and a mass storage device (such as hard disk drive, a solid state drive, compact disk ("CD"), digital versatile disk ("DVD")) (not shown), and so forth. In various embodiments, the processor 804 may be integrated on the same die with other components to form a System on Chip ("SoC").

In various embodiments, volatile memory (e.g., DRAM 808), non-volatile memory (e.g., ROM 810), flash memory 812, and the mass storage device may include programming instructions configured to enable computing device 800, in response to execution by processor(s) 804, to practice all or selected aspects of method 600. For example, one or more of the memory components such as volatile memory (e.g., DRAM 808), non-volatile memory (e.g., ROM 810), flash memory 812, and the mass storage device may include temporal and/or persistent copies of instructions that, when executed, cause computing device 800 to operate a emulator 202 or a software version of hot spot detector 702, a profiler 204/704 and/or an analyzer 206/706 configured to practice all or selected aspects of method 600.

The communication chips 806 may enable wired and/or wireless communications for the transfer of data to and from the computing device 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. Most of the embodiments described herein include WiFi and LTE RAT as examples. However, the communication chip 806 may implement any of a number of wireless standards or protocols, including but not limited to IEEE 802.20, General Packet Radio Service ("GPRS"), Evolution Data Optimized ("Ev-DO"), Evolved High Speed Packet Access ("HSPA+"), Evolved High Speed Downlink Packet Access ("HSDPA+"). Evolved High Speed Uplink Packet Access ("HSUPA+"), Global System for Mobile Communications ("GSM"), Enhanced Data rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as any other wireless protocols that are designated as 3G, 4G, 5G, and beyond. The computing device 800 may include a plurality of communication chips 806. For instance, a first communication chip 806 may be dedicated to shorter range wireless communications such as Wi-Fi and Bluetooth and a second communication chip 806 may be dedicated to longer range wireless communications such as GPS, EDGE, GPRS, CDMA, WiMAX, LTE, Ev-DO, and others.

In various implementations, the computing device 800 may be a laptop, a netbook, a notebook, an ultrabook, a smart phone, a computing tablet, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 800 may be any other electronic device that processes data.

EXAMPLES

Example 1 is directed to at least one computer-readable medium having computer-readable code embodied therein, the computer-readable code configured to cause a computing device, in response to execution of the code, to analyze execution of a plurality of executable instructions and, based on the analysis, provide an indication of a benefit to be obtained by vectorization of at least a subset of the plurality of executable instructions, wherein the analysis comprises identification of the subset of the plurality of executable instructions suitable for conversion to one or more single instruction multiple data ("SIMD") instructions.

Example 2 includes the at least one computer-readable medium of Example 1, wherein the analysis comprises detection of one or more execution intensive spots in the plurality of executable instructions, and the identification comprises selection of the subset from within the one or more detected execution intensive spots.

Example 3 includes the at least one computer-readable medium of Example 1 or 2, wherein the analysis comprises detection of a set of executable instructions, {C}, comprising a loop in the plurality of executable instructions, and the identification comprises selection of the subset from {C}.

Example 4 includes the at least one computer-readable medium of Example 3, wherein the analysis further comprises detection of a set of executable instructions, {D}, from within {C}, that are without vector dependencies, and the identification further comprises selection of the subset from {D}.

Example 5 includes the at least one computer-readable medium of Example 4, wherein the analysis further comprises detection of one or more executable instructions, {E}, from within {D} that cause accesses of memory at addresses of regular intervals, and the identification comprises identification of executable instructions in {E}.

Example 6 includes the at least one computer-readable medium of Example 5, wherein the benefit to be obtained is provided as a count of executable instructions in {E} as a percentage of a count of executable instructions in {C}.

Example 7 includes the at least one computer-readable medium of Example 1 or 2, wherein the benefit to be obtained is provided as a reduction of a count of the plurality of executable instructions.

Example 8 includes the at least one computer-readable medium of Example 3, wherein the benefit to be obtained is provided as a reduction of a count of executable instructions in {C}.

Example 9 includes the at least one computer-readable medium of Example 1 or 2, wherein the plurality of executable instructions comprises an instruction trace.

Example 10 is directed to a system, comprising: one or more processors; memory coupled to the one or more processors; an analyzer to be operated by the one or more processors to analyze execution of a plurality of executable instructions and, based on the analysis, provide an indication of a benefit to be obtained by vectorization of at least a subset of the plurality of executable instructions, wherein the analysis comprises identification of the subset of the plurality of executable instructions suitable for conversion to one or more single instruction multiple data ("SIMD") instructions.

Example 11 includes the system of Example 10, and further comprises a profiler to be operated by the one or more processors to detect one or more execution intensive spots in the plurality of executable instructions, wherein the analyzer is configured to select the subset from within the one or more detected execution intensive spots.

Example 12 includes the system of Example 10 or 11, wherein the analyzer is further configured to: detect a set of executable instructions, {C}, comprising a loop in the plurality of executable instructions: and select the subset from {C}.

Example 13 includes the system of Example 12, wherein the analyzer is further configured to: detect a set of executable instructions, {D}, from within {C}, that are without vector dependencies; and select the subset from {D}.

Example 14 includes the system of Example 13, wherein the analyzer is further configured to: detect one or more executable instructions, {E}, from within {D} that cause accesses of the memory at addresses of regular intervals; and select, for inclusion in the subset, the executable instructions in {E}.

Example 15 includes the system of Example 14, wherein the analyzer is further configured to provide the benefit to be obtained as a count of executable instructions in {E} as a percentage of a count of executable instructions in {C}.

Example 16 includes the system of Example 10 or 11, wherein the analyzer is further configured to provide the benefit to be obtained as a reduction of a count of the plurality of executable instructions.

Example 17 includes the system of Example 12, wherein the analyzer is further configured to provide the benefit to be obtained as a reduction of a count of executable instructions in {C}.

Example 18 includes the system of Example 10 or 11, wherein the plurality of executable instructions comprises an instruction trace.

Example 19 is directed to a computer-implemented method, comprising: analyzing, by a computing device, execution of a plurality of executable instructions; identifying, by the computing device, the subset of the plurality of executable instructions suitable for conversion to one or more single instruction multiple data ("SIMD") instructions; and providing, by the computing device, an indication of a benefit to be obtained by vectorization of at least the subset of the plurality of executable instructions.

Example 20 includes the computer-implemented method of Example 19, wherein the analyzing comprises detecting one or more execution intensive spots in the plurality of executable instructions, and the identifying comprises selecting the subset from within the one or more detected execution intensive spots.

Example 21 includes the computer-implemented method of Example 19 or 20, wherein the analyzing comprises detecting a set of executable instructions, {C}, comprising a loop in the plurality of executable instructions, and the identifying comprises selecting the subset from {C}.

Example 22 includes the computer-implemented method of Example 21, wherein the analyzing further comprises detecting of a set of executable instructions, {D}, from within {C}, that are without vector dependencies, and the identifying comprises selecting the subset from {D}.

Example 23 includes the computer-implemented method of Example 22, wherein the analyzing further comprises detecting of one or more executable instructions, {E}, from within {D} that cause accesses of memory at addresses of regular intervals, and the identifying comprises identifying executable instructions in {E}.

Example 24 includes the computer-implemented method of Example 23, wherein the providing comprises providing the benefit to be obtained as a count of executable instructions in {E} as a percentage of a count of executable instructions in {C}.

Example 25 includes the computer-implemented method of Example 19 or 20, wherein the providing comprises providing the benefit to be obtained as a reduction of a count of the plurality of executable instructions.

Example 26 includes the computer-implemented method of Example 21, wherein the providing comprises providing the benefit to be obtained as a reduction of a count of executable instructions in {C}.

Example 27 includes the computer-implemented method of Example 19, wherein the plurality of executable instructions comprises an instruction trace.

Example 28 is directed to an apparatus, comprising: means for analyzing execution of a plurality of executable instructions; means for identifying the subset of the plurality of executable instructions suitable for conversion to one or more single instruction multiple data ("SIMD") instructions; and means for providing an indication of a benefit to be obtained by vectorization of at least the subset of the plurality of executable instructions.

Example 29 includes the apparatus of Example 28, wherein the means for analyzing comprises means for detecting one or more execution intensive spots in the plurality of executable instructions, and the means for identifying comprises means for selecting the subset from within the one or more detected execution intensive spots.

Example 30 includes the apparatus of Example 28 or 29, wherein the means for analyzing comprises means for detecting a set of executable instructions, {C}, comprising a loop in the plurality of executable instructions, and the means for identifying comprises means for selecting the subset from {C}.

Example 31 includes the apparatus of Example 20, wherein the means for analyzing further comprises means for detecting of a set of executable instructions, {D}, from within {C}, that are without vector dependencies, and the means for identifying comprises selecting the subset from {D}.

Example 32 include the apparatus of Example 31, wherein the means for analyzing further comprises means for detecting of one or more executable instructions, {E}, from within {D} that cause accesses of memory at addresses of regular intervals, and the means for identifying comprises identifying executable instructions in {E}.

Example 33 includes the apparatus of Example 32, wherein the means for providing comprises means for providing the benefit to be obtained as a count of executable instructions in {E} as a percentage of a count of executable instructions in {C}.

Example 34 includes the apparatus of Example 28 or 29, wherein the means for providing comprises means for providing the benefit to be obtained as a reduction of a count of the plurality of executable instructions.

Example 35 includes the apparatus of Example 30, wherein the means for providing comprises means for providing the benefit to be obtained as a reduction of a count of executable instructions in {C}.

Example 36 includes the apparatus of Example 28, wherein the plurality of executable instructions comprises an instruction trace.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. At least one non-transitory computer-readable medium having computer-readable code embodied therein, wherein the computer-readable code is to cause a computing device, in response to execution of the computer-readable code, to analyze execution of a plurality of executable instructions and, based on the analysis, output an indication of a benefit that can be obtained by vectorization of at least a subset of the plurality of executable instructions to enable selective vectorization of the subset of the plurality of executable instructions, wherein the analysis comprises identification of the subset of the plurality of executable instructions suitable for conversion to one or more single instruction multiple data ("SIMD") instructions;
   wherein the analysis comprises detection of a set of executable instructions, {C}, comprising a loop in the plurality of executable instructions, and the identification comprises selection of the subset of the plurality of executable instructions from {C}; and
   wherein the analysis further comprises detection of a set of executable instructions, {D}, from within {C}, that are without vector dependencies, and the identification further comprises selection of the subset of the plurality of executable instructions from {D}.

2. The at least one computer-readable medium of claim 1, wherein the analysis comprises detection of one or more execution intensive spots in the plurality of executable instructions, and the identification comprises selection of the subset of the plurality of executable instructions from within the one or more detected execution intensive spots.

3. The at least one computer-readable medium of claim 1, wherein the analysis further comprises detection of one or more executable instructions, {E}, from within {D} that cause accesses of memory at addresses of regular intervals, and the identification comprises identification of executable instructions in {E}.

4. The at least one computer-readable medium of claim 3, wherein the benefit that can be obtained is a count of executable instructions in {E} as a percentage of a count of executable instructions in {C}.

5. The at least one computer-readable medium of claim 1, wherein the benefit that can be obtained is a reduction of a count of the plurality of executable instructions.

6. The at least one computer-readable medium of claim 1, wherein the benefit that can be obtained is a reduction of a count of executable instructions in {C}.

7. The at least one computer-readable medium of claim 1, wherein the plurality of executable instructions comprises an instruction trace.

8. A system, comprising:
one or more processors;
memory coupled to the one or more processors;
an analyzer to be operated by the one or more processors to analyze execution of a plurality of executable instructions and, based on the analysis, output an indication of a benefit that can be obtained by vectorization of at least a subset of the plurality of executable instructions to enable selective vectorization of the subset of the plurality of executable instructions, wherein the analysis comprises identification of the subset of the plurality of executable instructions suitable for conversion to one or more single instruction multiple data ("SIMD") instructions;
wherein the analyzer is set to detect a set of executable instructions, {C}, comprising a loop in the plurality of executable instructions; and select the subset of the plurality of executable instruction from {C}; and
wherein the analyzer is to further detect a set of executable instructions, {D}, from within {C}, that are without vector dependencies; and select the subset of the plurality of executable instructions from {D}.

9. The system of claim 8, further comprising a profiler to be operated by the one or more processors to detect one or more execution intensive spots in the plurality of executable instructions, wherein the analyzer is configured to select the subset of the plurality of executable instructions from within the one or more detected execution intensive spots.

10. The system of claim 8, wherein the analyzer is further configured to:
detect one or more executable instructions, {E}, from within {D} that cause accesses of the memory at addresses of regular intervals; and
select, for inclusion in the subset of the plurality of executable instructions, the one or more executable instructions in {E}.

11. The system of claim 10, wherein the analyzer is further configured to output the benefit that can be obtained as a count of executable instructions in {E} as a percentage of a count of executable instructions in {C}.

12. The system of claim 8, wherein the analyzer is further configured to output the benefit that can be obtained as a reduction of a count of the plurality of executable instructions.

13. The system of claim 8, wherein the analyzer is further configured to output the benefit that can be obtained as a reduction of a count of executable instructions in {C}.

14. The system of claim 8, wherein the plurality of executable instructions comprises an instruction trace.

15. A computer-implemented method, comprising:
analyzing, by a computing device, execution of a plurality of executable instructions;
identifying, by the computing device, a subset of the plurality of executable instructions suitable for conversion to one or more single instruction multiple data ("SIMD") instructions; and
outputting, by the computing device, an indication of a benefit that can be obtained by vectorization of at least the subset of the plurality of executable instructions to enable selective vectorization of the subset of the plurality of executable instructions;
wherein the analyzing comprises:
detecting one or more execution intensive spots in the plurality of executable instructions;
detecting a set of executable instructions, {C}, comprising a loop in the plurality of executable instructions;
detecting of a set of executable instructions, {D}, from within {C}, that are without vector dependencies.

16. The computer-implemented method of claim 15, wherein the analyzing comprises:
detecting of one or more executable instructions, {E}, from within {D} that cause accesses of memory at addresses of regular intervals,
wherein the identifying comprises identifying executable instructions in {E}.

17. The computer-implemented method of claim 16, wherein the outputting comprises:
outputting the benefit that can be obtained as a count of executable instructions in {E} as a percentage of a count of executable instructions in {C};
outputting the benefit that can be obtained as a reduction of a count of the plurality of executable instructions; or
outputting the benefit that can be obtained as a reduction of a count of executable instructions in {C}.

* * * * *